United States Patent [19]

Takei

[11] Patent Number: 5,345,832
[45] Date of Patent: Sep. 13, 1994

[54] DRIVE APPARATUS

[75] Inventor: Seiji Takei, Kanagawa, Japan

[73] Assignee: Nippon Thompson Co., Ltd., Tokyo, Japan

[21] Appl. No.: 7,798

[22] Filed: Jan. 22, 1993

[30] Foreign Application Priority Data

Feb. 7, 1992 [JP] Japan .................................. 4-056069

[51] Int. Cl.⁵ ...................... F16H 27/02; F16H 15/08; G05G 11/00
[52] U.S. Cl. .................................. 74/89; 74/479 PH; 476/67; 384/43; 384/45
[58] Field of Search ............... 74/422, 479 R, 479 PF, 74/479 PH, 479 MF, 89; 476/15, 25, 64, 67, 68, 69, 70, 72; 384/43, 44, 45, 49; 105/30; 108/143; 405/91

[56] References Cited

U.S. PATENT DOCUMENTS

| | | | |
|---|---|---|---|
| 645,646 | 3/1900 | Morgan | 105/30 |
| 3,348,421 | 10/1967 | Boice | 476/67 X |
| 3,555,961 | 1/1971 | Vitushkin et al. | 408/91 X |
| 3,807,312 | 4/1974 | Flodell | 105/30 X |
| 4,304,187 | 12/1981 | Becker et al. | 105/30 X |
| 4,378,709 | 4/1983 | Chitayat | 74/89 X |
| 4,934,202 | 6/1990 | Hikita et al. | 74/424.8 X |
| 4,934,278 | 6/1990 | Tanita et al. | 105/30 X |
| 4,943,169 | 7/1990 | Kasai | 384/45 X |

FOREIGN PATENT DOCUMENTS

| | | | |
|---|---|---|---|
| 265855 | 5/1988 | European Pat. Off. | 74/479 PH |
| 58-196356 | 11/1983 | Japan | 74/422 |
| 2-154853 | 6/1990 | Japan | 476/67 |

OTHER PUBLICATIONS

Heilich, III, et al, Traction Drives: Selection and Application, Marcel Dekker, Inc., 1983, pp. 30, 31, 144–159.

Primary Examiner—Leslie A. Braun
Assistant Examiner—David W. Laub
Attorney, Agent, or Firm—Sughrue, Mion, Zinn, Macpeak & Seas

[57] ABSTRACT

The present invention provides a drive apparatus comprising a track rail having a track formed along its axial direction, and a slider guided by the track. The slider has a rolling element circulating path, and a torque generating device, having an output shaft, is mounted on the slider. The apparatus also includes a plurality of drive rollers and at least one substantially spherical rolling element disposed in the rolling element circulating path. The torque generating device applies a torque to the drive rollers to cause the drive rollers to roll while engaging with the track rail to move the slider along the track, and the rolling elements contact the track rail and move along in the rolling element circulating path when the slider moves along the track. The apparatus further includes an oil film forming device which forms an oil film between the track rail and the drive rollers.

4 Claims, 12 Drawing Sheets

DRIVE APPARATUS

BACKGROUND OF THE INVENTION

1. Field of the Invention

The present invention relates to a drive apparatus for moving a certain object (driven object) in a desired direction.

2. Description of the Prior Art

Figure 1:
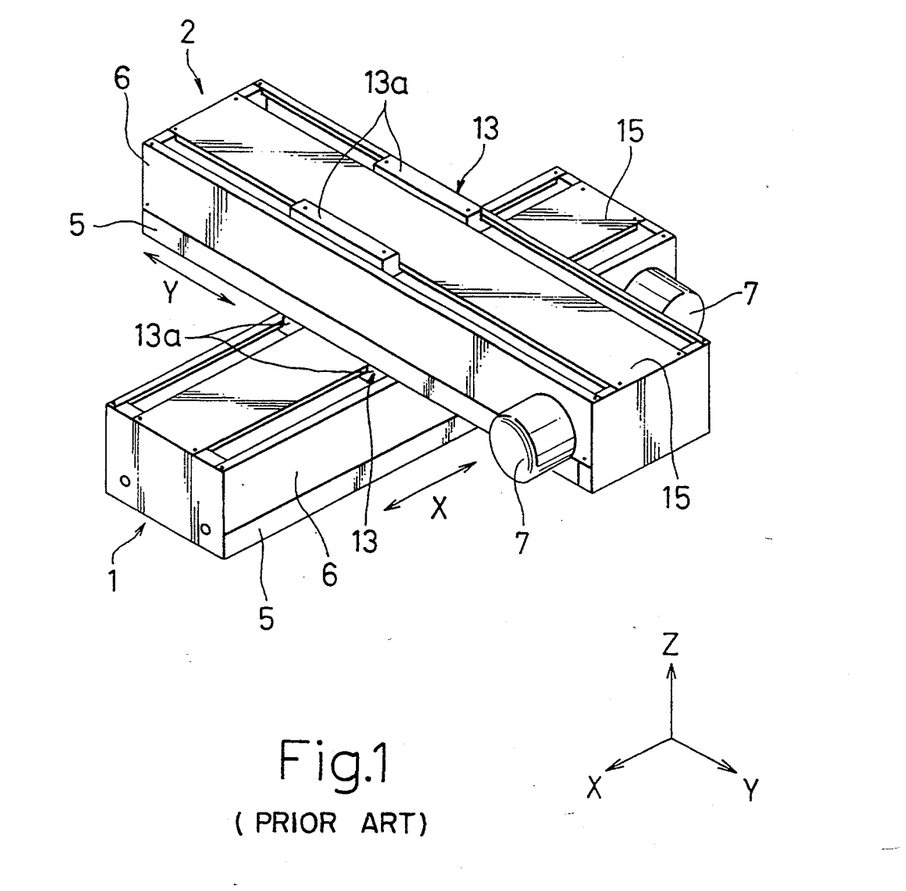
FIG. 1 is a perspective view of an XY table equipped with an example of a drive apparatus of the prior art.

An example of the prior art having this type of drive apparatus is the XY table indicated in FIG. 1.

Figure 2:
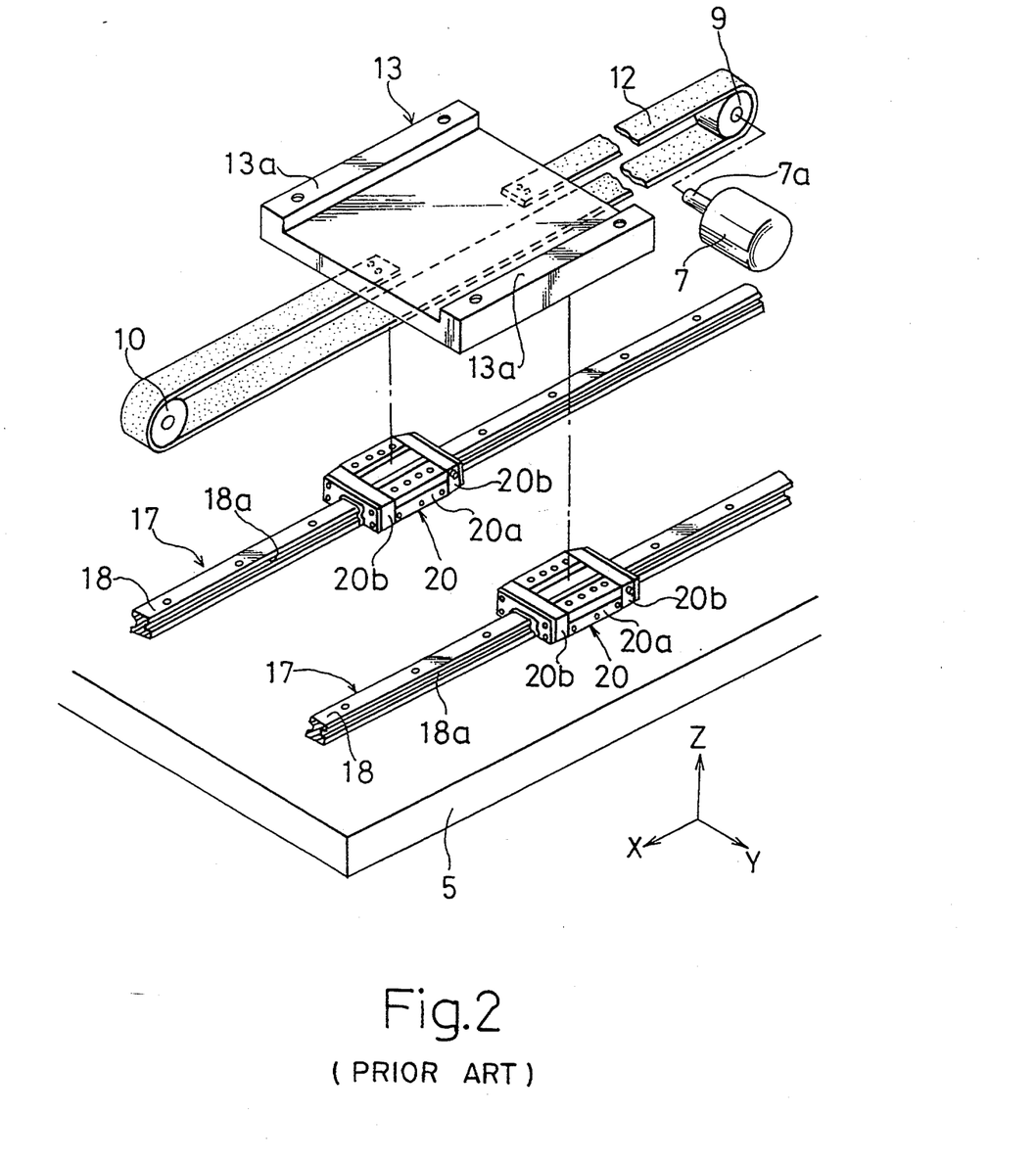
FIG. 2 is an exploded perspective view of a drive apparatus contained in the XY table indicated in FIG. 1.

As indicated in FIG. 1, said XY table is comprised of X table 1 installed on the floor or a mounting frame in a workshop, and Y table 2 moved by said X table 1. Furthermore, since X table 1 and Y table 2 mutually have nearly the same constitution, the following detailed explanation will be provided with respect to X table 1 only, and an explanation of Y table 2 omitted. However, those constituent members of Y table 2 that correspond to the constituent members of X table 1 are indicated using the same reference numerals. Furthermore, an exploded view of the constituent members of X table 1 divided into suitable blocks is indicated in FIG. 2.

As indicated in FIG. 1, X table 1 has a long, roughly rectangular plate-shaped base 5, and side plate 6, provided on said base 5 and forming a box with said base 5. Motor 7 is mounted on one end of this side plate 6. In addition, as is indicated in FIG. 2, pulley 9 is fit onto output shaft 7a of motor 7. In addition, another pulley 10 is arranged on base 5, and is mounted to base 5 by means of brackets not shown. Endless belt 12 is wrapped around pulleys 9 and 10. A driven object in the form of moving table 13 is fastened to this belt 12.

As indicated in the drawings, moving table 13 has a prescribed thickness and is composed to be of a size that allows it to be contained within the width of side plate 6. Two table projections 13a projecting above the upper surface of side plate 6 are provided in parallel on the left and right sides. These table projections 13a may be formed into an integrated structure with moving table 13 or may be composed in the form of separate structures. Above-mentioned Y table 2 is mounted on the upper surface of said table projections. Furthermore, cover 15 is arranged to the inside of these table projections 13a, acting to prevent entrance of dust and so on.

A driving device that drives belt 12 is comprised of the above-mentioned motor 7, pulley 9 and pulley 10.

On the other hand, as is indicated in FIG. 2, a pair of linear motion rolling guide units 17 are mutually arranged in parallel on the right and left sides of the above-mentioned belt 12, and are mounted on base 5. These linear motion rolling guide units 17 receive the load in all four directions (the directions indicated by arrows Z and Y as well as their respective opposite directions) applied to moving table 13, and also act as guiding devices that guide moving table 13. The driving apparatus that moves moving table 13, the driven object, is composed of these linear motion rolling guide units 17 and the above-mentioned belt 12 and its driving device.

More specifically, linear motion rolling guide unit 17 is composed of track rail 18, roughly in the shape of a square column, in which track groove 18a, having a semi-circular cross-section, is formed in the left and right shoulders of the side wall, and slider 20, which is guided by said track rail 18. In addition, this slider can slide relative to track rail 18 being straddled across said track rail 18. Said slider 20 also has casing 20a, in which track grooves (not shown), having a semi-circular cross-section, are formed in the inside surface so as to oppose track grooves 18a of said track rail 18, a plurality of balls (not shown) that roll over a track path formed by both said track grooves in relative motion, and end caps 20b mounted on both ends in the lengthwise direction of said casing. Furthermore, linear motion rolling guide units 17 are not limited to the use of balls, but may also use other devices such as rollers as long as they are of a constitution that uses a rolling object.

The following provides an explanation of the operation of the XY table having the above-mentioned constitution. Furthermore, since X table 1 and Y table 2 have the same constitution as described above, the following explanation will deal primarily with X table 1.

Firstly, when a power voltage is supplied to motor 7 of X table 1, output shaft 7a of motor 7, serving as the driving source, rotates which transmits torque to pulley 9. Then, belt 12, wrapped around pulley 9 and pulley 10, is driven in a prescribed direction, and moving table 13, mounted on the upper surface of this belt 12, also moves guided by linear motion rolling guide units 17. Conversely, when the direction of rotation of motor 7 is reversed, belt 12 is driven in the opposite direction from that above, and consequently, moving table 13 also moves in that direction. In addition, the movement of moving table 13 is controlled by a control circuit composed of a microcomputer and so on. A detector, which outputs a position detection signal to this control circuit, is composed to be able to be mounted to the inside of side plate 6 indicated in FIG. 1, and on the upper surface of base 5. In addition, detection may also be performed by an encoder mounted behind motor 7.

In addition, since Y table 2 is mounted on table projections 13a of moving table 13 equipped on X table 1, it moves in the X direction which is the same direction as moving table 13 of X table 1. As moving table 13 of Y table 2 is composed so as to be able to independently move linearly in the Y direction, by controlling these with a control circuit not shown, moving table 13 of Y table 2 can be moved in both the X and Y directions.

Figure 3:
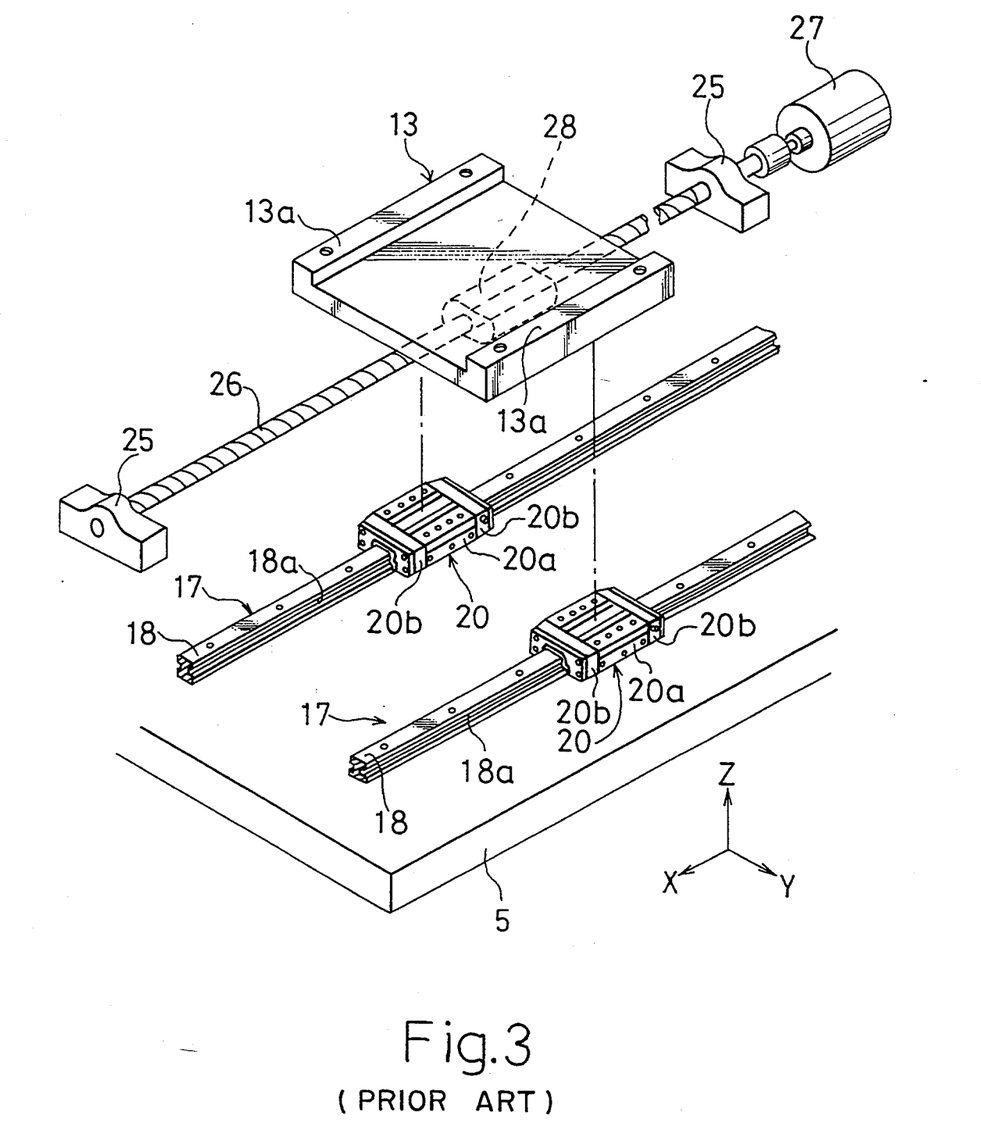
FIG. 3 is an exploded perspective view of a second example of a drive apparatus of the prior art.

FIG. 3 indicates the drive apparatus of a second example of the prior art. This drive apparatus can be incorporated into the XY table indicated in FIG. 1 in the same manner as the drive apparatus of the first example of the prior art indicated in FIG. 2.

As indicated in FIG. 3, said drive apparatus has long ball screw 26, provided in parallel with track rail 18 equipped with linear motion rolling guide unit 17, and attached at both ends to base 5 by means of support bearings 25, motor 27 that rotates said ball screw 26, and nut 28 engaging with ball screw 26 and mounted with respect to moving table 13, the driven object.

Furthermore, since the drive apparatus indicated in FIG. 3 is composed in the same manner as the first example of a drive apparatus of the prior art indicated in FIG. 2 with respect to portions other than those described above, an explanation of the entire apparatus will be omitted. In addition, in the above-mentioned explanation, the same reference numerals are used for those constituents that are identical to the constituents equipped on the first example of the prior art.

In said second example of a drive apparatus of the prior art, when ball screw 26 is driven to rotate by motor 27, moving table 13 moves together with nut 28.

As described above, in addition to linear motion rolling guide unit 17 for guiding of the driven object, the drive apparatus of the prior art has long components for transmission of driving force, such as belt 12 or ball screw 26, motors 7 and 27, that serve as the driving source, and several other peripheral components, such as pulleys and bearings, related to these. Accordingly, this drive apparatus has the shortcomings of being large in size and having a large number of components resulting in high costs. In addition, since the driving force produced by motors 7 and 27, serving as the driving sources, is transmitted through numerous members, such as long components, for transmission of driving force, this drive apparatus has the additional shortcoming of it being difficult to attain a high degree of accuracy in movement and positioning of the driven object. Moreover, together with it not always being easy to attain high-speed driving with this drive apparatus, due to the large number of components operating relative to each other, this drive apparatus has the shortcoming of producing a relatively high level of noise. In the case of using the above-mentioned belt 12 in particular, since said belt becomes stretched due to application of torque, together with positioning accuracy being poor, there is also the shortcoming of dust and debris being produced from said belt 12. In addition, in the case of the above-mentioned ball screw 26, since deflection of the screw shaft occurs when this is excessively long, sliding characteristics become unstable.

SUMMARY OF THE INVENTION

In consideration of the above-mentioned shortcomings of the prior art, the object of the present invention is to provide a drive apparatus that is compact in size, low in cost, allows the attaining of a high degree of accuracy as well as high-speed driving, suppresses the production of noise, obtains a large thrust, and demonstrates a stable operating state.

The present invention comprises: a track rail having a track formed along the axial direction; a slider guided by the above-mentioned track; a torque generation device mounted on the above-mentioned slider; and, a plurality of drive rollers that roll while engaging with the above-mentioned track rail by application of torque by the output shaft of the above-mentioned torque generation device.

DESCRIPTION OF THE PREFERRED EMBODIMENTS

The following provides a detailed explanation of a drive apparatus in the form of embodiments of the present invention with reference to the attached drawings.

Firstly, FIGS. 4 through 8 indicate a drive apparatus as a first embodiment of the present invention.

Figure 4:
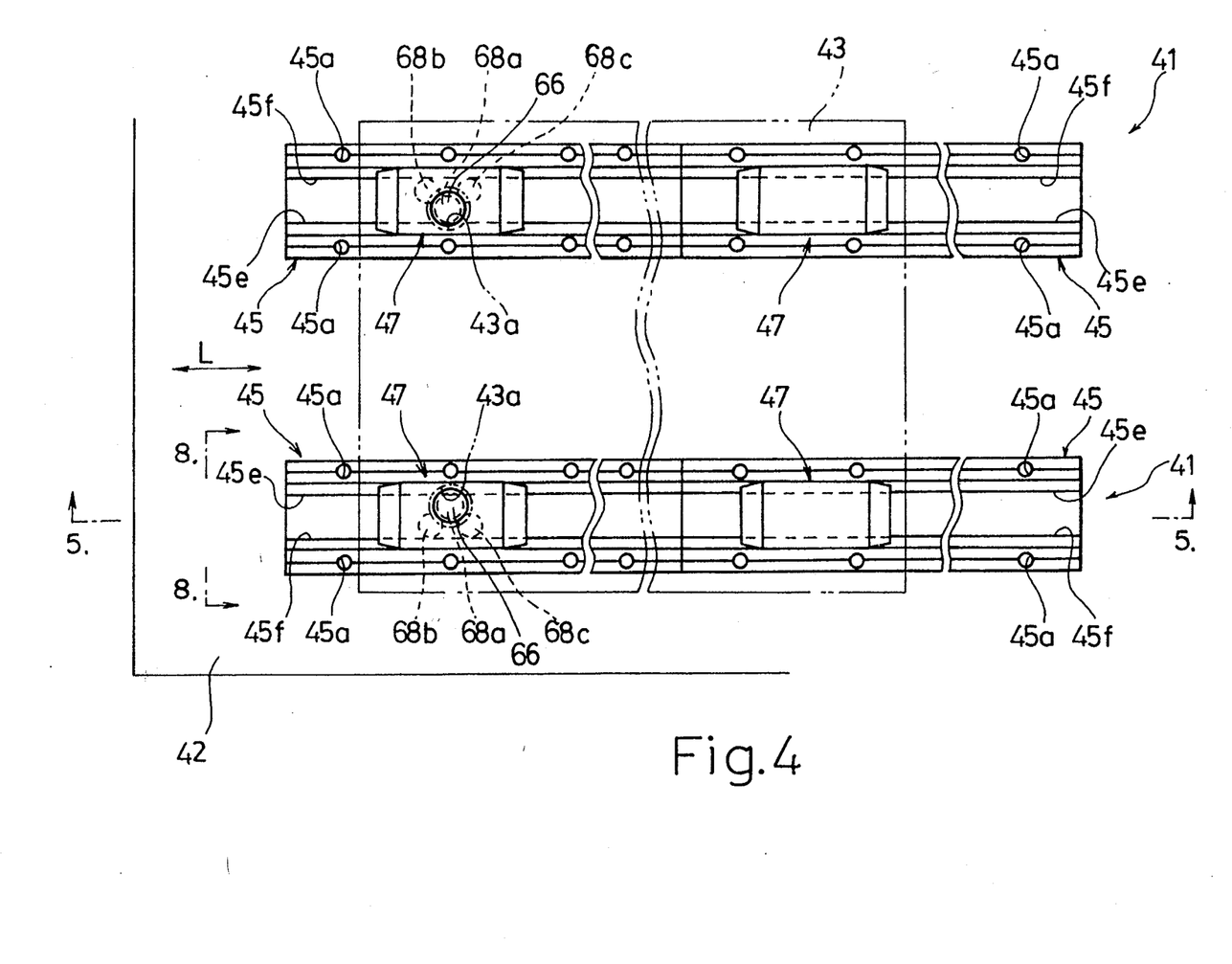
FIG. 4 is an overhead view indicating the drive apparatus of a first embodiment of the present invention mounted on the bed of a machine tool.
Figure 5:
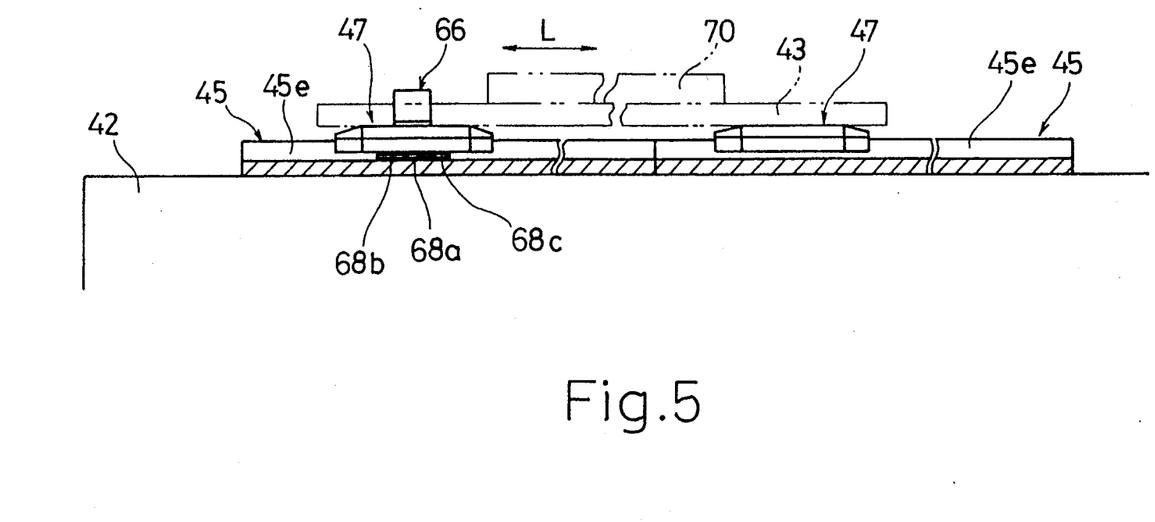
FIG. 5 is a cross-sectional view 5—5 relating to FIG. 4.

In FIGS. 4 and 5, two sets of this drive apparatus are provided in parallel on a frame, or in other words, bed 42 of a machine tool (the entire machine tool is not shown), and support and move in concert with table 43.

Figure 6:
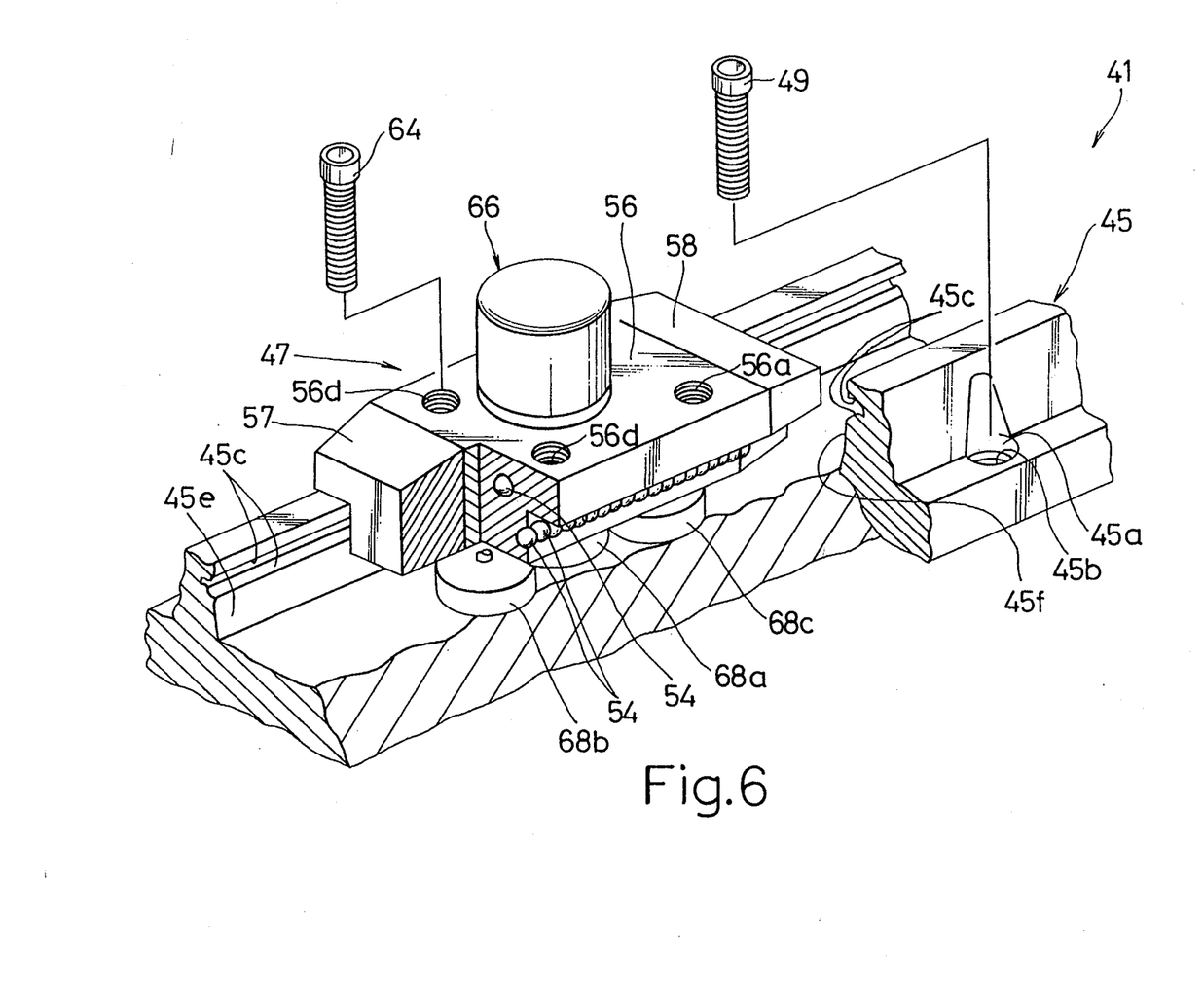
FIG. 6 is a perspective view, including a partial cross-section, of the essential components of the drive apparatus indicated in FIG. 4 and FIG. 5.

Both drive apparatuses 41 have two linear track rails 45 mounted in a single row on bed 42, and two slide units 47 in the form of sliders that are guided by said track rails 45. Furthermore, as indicated in FIG. 6, each track rail 45 is fastened to bed 42 by a plurality of bolts (with hexagon sockets) 49. More specifically, as is clear from FIGS. 7 and 8 in particular, track rail 45 has have flange portions on the bottoms of both sides, and countersunk portions 45a, having a diameter slightly larger than the heads of bolts 49 for fastening said track rail 45 to bed 42, and insertion holes 45b, having a diameter slightly larger than the threaded portions of bolts 49, are formed concentrically in said flange portions. Bolts 49 are screwed into bed 42 by being inserted into said countersunk portions and insertion holes so that they are completely embedded beneath the surface of said bed 42.

Figure 7:
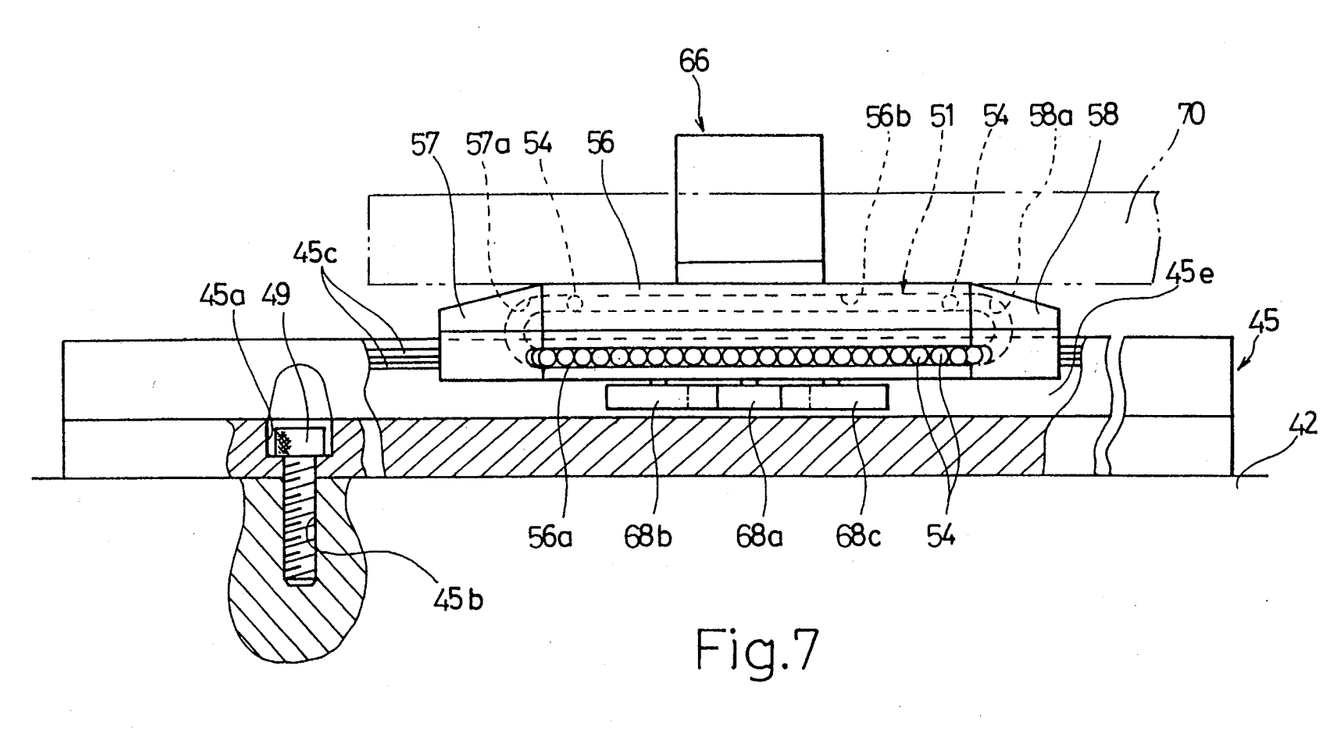
FIG. 7 is a side view, including a partial cross-section, of the essential components of the drive apparatus indicated in FIG. 4 and FIG. 5.
Figure 8:
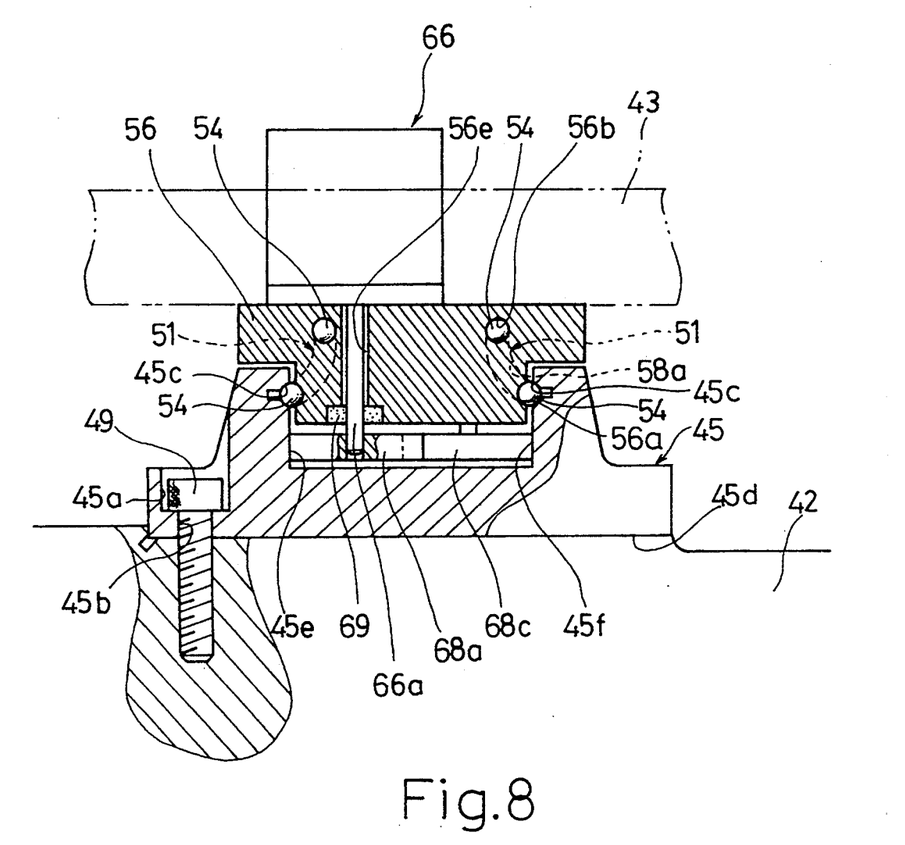
FIG. 8 is a cross-sectional view 8—8, including a partial cross-section, relating to FIG. 4.
Figure 12:
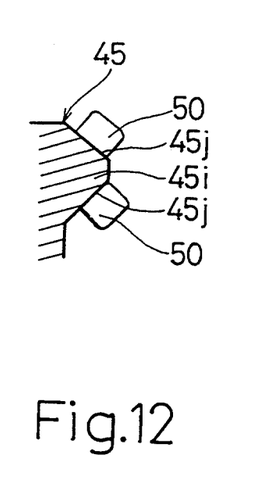
FIG. 12 is a vertical cross-sectional view indicating a variation of a portion of the track rail equipped on the drive apparatus pertaining to the present invention.

As is indicated in FIGS. 6 through 8, track rail 45 has a total of two tracks in the form of track grooves 45c, located on both sides of said track rail 45, that are formed extending along the axial direction L of said track rail 45, and having semi-circular cross-sections. However, the number of track grooves 45c is not limited to two. In addition, track rail 45 also has a flat mounting surface 45d on its bottom for fastening to bed 42. Slide unit 47 is arranged on track rail 45, and as indicated in FIG. 7 and FIG. 8, has two internal rolling element circulating paths 51 corresponding to each of the above-mentioned track grooves 45c. A plurality of rolling elements in the form of balls 54 are arranged and contained within these rolling element circulating paths 51. Each ball 54 rolls over track groove 45c accompanying movement of slide unit 47, thus resulting in circulation. As indicated in the drawings, slide unit 47 has casing 56, and a pair of end caps 57 and 58 coupled to both the front and back ends of said casing 56. Above-mentioned rolling element circulating path 51 is composed of load bearing track groove 56a and return path 56b, each formed linearly and in parallel with casing 56, and a pair of roughly semi-circular directional change paths 57a and 58a formed in both end caps 57 and 58 that connect said bearing track groove 56a and return path 56b at both of these ends. Furthermore, grease nipples (not shown) are attached on end caps 57 and 58 for supplying grease to the surface of the above-mentioned balls 54. In addition, as indicated in FIG. 6, a plurality of threaded holes 56d are formed in the upper side, or in other words the supporting side, of casing 56 of slide unit 47. Table 43, indicated in FIGS. 4 and 5, is then fastened to said casing 56 by bolts (with hexagon sockets) 64 screwed into these threaded holes 56d. Furthermore, although track equipped on track rail 45 is in the form of track groove 45c in this embodiment, in addition to this constitution, projections 45i may be provided linearly over roughly the entire length of track rail 45 as indicated in FIG. 12, and track surface 45j formed in said projections 45i may be used as the track. In addition, the rolling elements that roll over this track surface 45j may be in the form of rollers 50.

However, as indicated in FIGS. 4 through 8, motor 66 is mounted as a torque generation device in the center of the upper surface of casing 56 of slide unit 47. As is clear from FIG. 8, this motor 66 is attached so that its output shaft 66a is perpendicular to mounting surface 45d of said track rail 45, and in this case, facing downward. Since motor 66, being relatively heavy, is arranged on the upper surface of slide unit 47 in this manner, the moment applied to slide unit 47 based on the weight of motor 66 can be minimized. This is desirable since it ensures high-precision operation of slide unit 47. Furthermore, as indicated in FIG. 4, since motor 66 is provided on the upper surface of slide unit 47, or in other words on the surface that supports table 43, motor 66 is inserted into through holes 43a formed in said table 43 so that said motor 66 does not interfere with table 43.

As indicated in FIG. 8, output shaft 66a of motor 66 protrudes below the surface of casing 56 via through hole 56e formed in casing 56 of slide unit 47. Cylindrical drive roller 68a then fits into this protruding portion. Furthermore, this driving roller 68a is also shown in FIGS. 4 through 7. In addition, output shaft 66a is supported in the vicinity of its bottom end by casing 56 via bearing 69 comprised of a ball bearing or oilless bearing and so forth.

In addition, two other drive rollers 68b and 68c are offset from each other in the direction of movement of casing 56 on the bottom surface of casing 56, and are provided at locations so that they are sandwiched around the above-mentioned drive roller 68a. These drive rollers engage with the above-mentioned drive roller 68a so as to rotate in synchronization with said drive roller 68a.

On the other hand, as is indicated in FIG. 4, FIG. 6 and FIG. 7, track surfaces 45e and 45f are formed in track rail 45 in parallel with track grooves 45c equipped on said track rail 45 to allow the above-mentioned drive rollers 68a through 68c to roll while engaging with said drive rollers. More specifically, the inside surface in the vicinity of the bottom of track rail 45 having a U-shaped cross-section serves as these track surfaces 45e and 45f. The rolling surface of drive roller 68a engages with the track surface 45e, while the rolling surfaces of the other two drive rollers 68b and 68c engage with track surface 45f.

A prescribed amount of oil is constantly supplied to the above-mentioned track surfaces 45e and 45f. Accordingly, an oil film (not shown) is formed between drive roller 68a and said track surface 45e, between drive rollers 68b and 68c and track surface 45f, and between each of these three drive rollers. Consequently, slide unit 47 is propelled by means of the resistance, or in other words traction, that occurs when the oil film is sheared by the rotation of motor 66. Furthermore, although a traction drive system is employed in the subject embodiment, a so-called friction drive system may be employed in which the drive rollers and track surfaces as well as the drive rollers themselves may be brought in direct contact with each other without providing an oil film. In addition, traction drive or friction drive systems may also be employed in the drive apparatuses of other embodiments to be described later.

In the drive apparatus having the constitution described above, when motor 66 operates with workpiece 70, etc., placed and fastened on table 43 as indicated in FIG. 5, drive rollers 68a through 68c roll over track surfaces 45e and 45f. Accordingly, table 43 moves either back or forth as in the manner indicated with arrow L together with each slide unit 47 that support said table 43. The desired processing, such as cutting and so on, is then performed on workpiece 70, etc., accompanying this movement.

Figure 9:
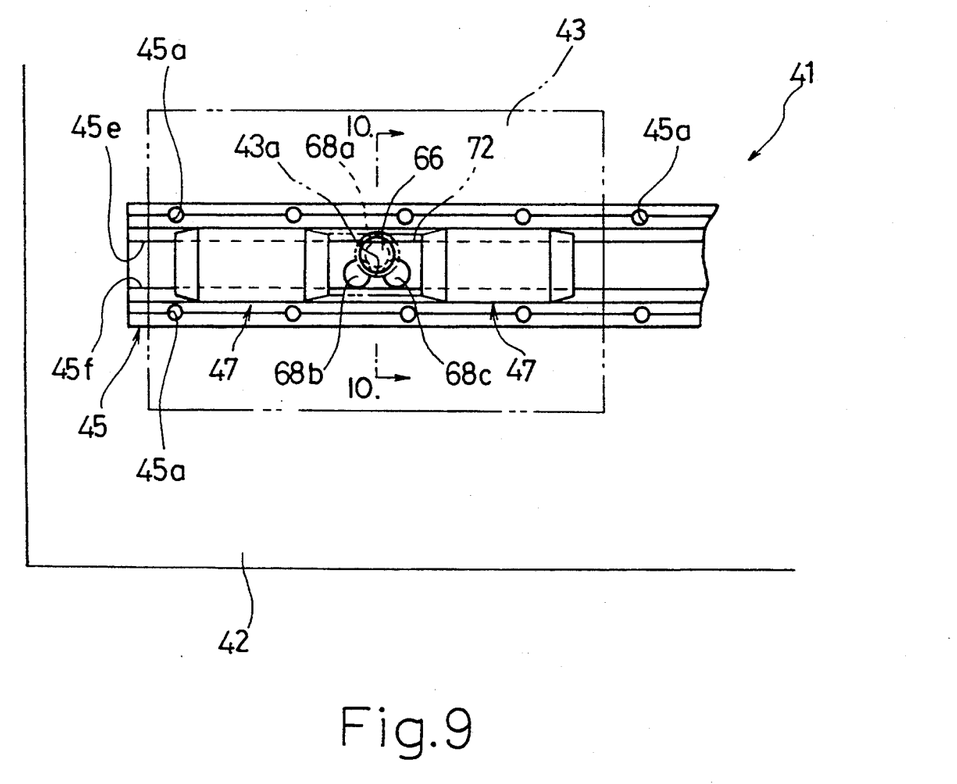
FIG. 9 is an overhead view indicating the drive apparatus of a second embodiment of the present invention mounted on the bed of a machine tool.
Figure 10:
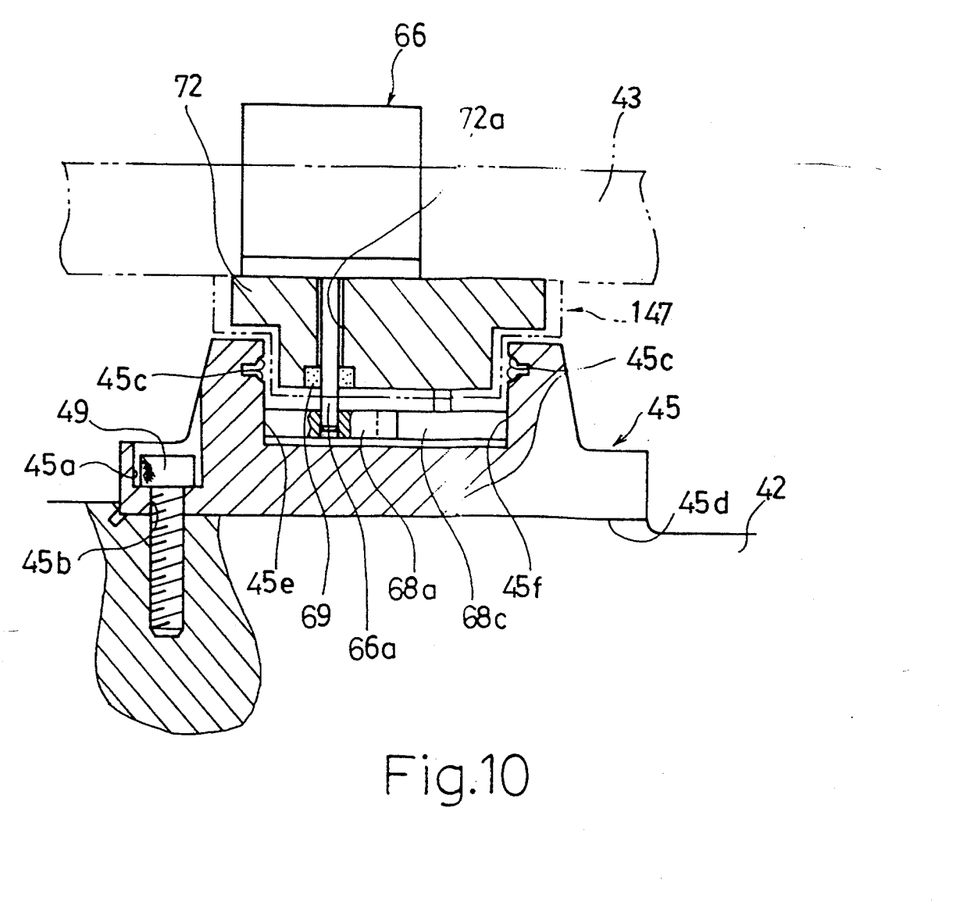
FIG. 10 is a cross-sectional view 10—10 relating to FIG. 9.

FIGS. 9 and 10 indicate the essential components of the drive apparatus of a second embodiment of the present invention. Furthermore, since the drive apparatus pertaining to this second embodiment is composed similar to the drive apparatus of the first embodiment indicated in FIGS. 4 through 8 with the exception of the essential components explained below, an explanation of this entire drive apparatus has been omitted. In addition, in the explanation provided below, the same reference numerals are used for those members that are either identical or correspond to constituent members of the drive apparatus of the first embodiment. In addition, this applies similarly to a third embodiment to be described later.

As indicated in FIGS. 9 and 10 of the subject drive apparatus, a plurality of slide units 147, in the form of two sliders arranged in a row in this case, are coupled into a single unit by coupling member 72 roughly in the shape of a flat plate. Motor 66 is mounted on the top of this coupling member 72, and output shaft 66a of said motor 66 is inserted into through hole 72a formed in said coupling member 72. Furthermore, output shaft 66a is supported in the vicinity of its end by coupling member 72 via bearing 69.

Drive roller 68a fit onto output shaft 66a of motor 66 engages with the track surface 45e, while the other two drive rollers 68b and 68c engage with the other track surface 45f by pivoting of coupling member 72.

Figure 11:
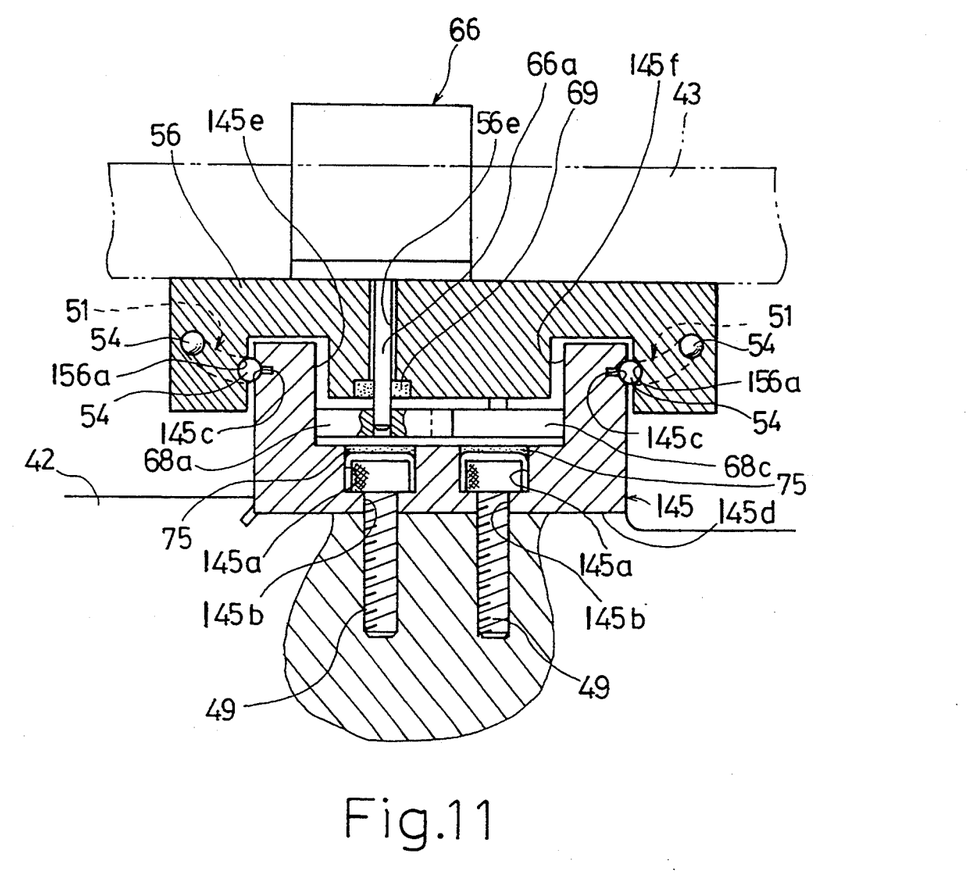
FIG. 11 is a vertical cross-sectional view of the drive apparatus of a third embodiment of the present invention.

FIG. 11 indicates a drive apparatus in the form of a third embodiment of the present invention. As indicated in the drawing, track rail 145 does not have a flange portion in this drive apparatus. Accordingly, bolts 49 for mounting said track rail 145 to base 42 are arranged in the bottom of said track rail 145 formed to have a roughly U-shaped cross-section to provide track surfaces 145e and 145f. Track grooves 145c are then formed in the outside surfaces of track rail 145a.

On the other hand, casing 156, having rolling element circulating paths 151, is straddled across this track rail 145, with load bearing track grooves 156a formed in its inside surfaces.

Furthermore, as indicated in the drawings, caps 75 are tightly inserted into countersunk portions 145a formed in the bottom of track rail 145 for insertion of the bolt heads. These caps 75 need not be provided.

Furthermore, in each of the above-mentioned embodiments, although each drive apparatus 41 is equipped with one motor 66 and three drive rollers each, there are no limitations on the number of these constituents. In other words, the drive apparatus 41 may be equipped with two drive rollers, 4 drive rollers or more.

In addition, it goes without saying that the present invention is not limited to the above-mentioned first through third embodiments, but can realize a diverse range of constitutions by suitably combining the constitutions of each embodiment.

In addition, in each of the above-mentioned embodiments, although balls 54 circulate within slide unit 47 accompanying movement of said slide unit 47, said embodiments are not limited to said constitution, but other constitutions may naturally be applied as well. Moreover, although balls are used for the rolling elements in each of the embodiments, a constitution may also be employed using rollers.

Moreover, although the case of using motor 66 for the torque generation device is indicated in each of the above-mentioned embodiments, various other torque generation devices, such as that combining a motor and a speed reduction mechanism, can also be applied.

Finally, although drive roller 68a is directly attached to output shaft 66a of motor 66 in each of the above-mentioned embodiments, a constitution may be employed in which this drive roller 68a is attached to casing 56 or 156, and a speed reduction mechanism, etc., is installed between said drive roller 68a and motor 66. In addition, other drive rollers 68b and 68c may be driven by engaging with this drive roller 68a in a manner similar to the above-mentioned constitution. Alternatively, said drive rollers 68b and 68c may also be driven by applying torque from output shaft 66a of motor 66 via respective speed reduction mechanisms.

In addition, although track rails 45 and 145 are of a linear shape in each of the above-mentioned embodiments, said track rail 45 can also be curved.

According to the present invention as described above, since driving of a slider is performed by a torque generation device installed to have a compact form, the present invention offers the first advantage of allowing the overall size of the drive apparatus to be reduced.

In addition, since the above-mentioned driving is only the result of directly engaging a track rail and a drive roller to which torque is applied by the output shaft of a torque generation device, a member for transmitting driving force is not required resulting in reduced costs, thereby offering the second advantage of the present invention.

Moreover, since a driving force transmission member is not provided between the drive roller and track rail as indicated above, in comparison with apparatuses of the prior art in which driving force is transmitted through numerous driving force transmission members, movement of the driven object and positioning accuracy, which are effected by the number of components and manufacturing accuracy, are dramatically improved, thereby resulting in the third advantage of the present invention.

In addition, since the total weight of moving components consisting of the slider and torque generation device is small, together with it being easy to drive the drive apparatus at high-speed, since the number of components operating relative to each other is also low, the present invention offers the fourth advantage of allowing suppression of the level of noise.

In addition, since a plurality of drive rollers are provided in the drive apparatus according to the present invention, there are numerous points of contact between the drive rollers and track rail, which together with resulting in large thrust, also results in stable operation, thereby offering the fifth advantage of the present invention.

What is claimed is:

1. A drive apparatus comprising:
   a track rail having a track formed along the axial direction;
   a slider guided by the track and having a rolling element circulating path;
   a torque generation device, having an output shaft, mounted on the slider;
   a plurality of drive rollers, the output shaft of the torque generation device applying torque to the drive rollers to cause the drive rollers to roll while engaging the track rail to move the slider along the track; and
   at least one substantially spherical rolling element, disposed in the rolling element circulating path, for contacting the track rail and moving along in the rolling element circulating path when the slider moves along the track.

2. The drive apparatus of claim 1, further comprising means for forming an oil film between the track rail and the drive rollers.

3. The drive apparatus of claim 1, wherein one of the drive rollers is attached to the output shaft, and the remaining drive rollers are mounted to pivot with respect to the slider and engage the drive roller attached to the output shaft.

4. A drive apparatus comprising:
   a track rail having a track formed along the axial direction;
   a plurality of sliders disposed on the track rail, guided by the track, and each having a rolling element circulating path, the sliders being mutually coupled as a single unit;
   a torque generation device, having an output shaft;
   a plurality of drive rollers, the torque generation device and the drive rollers being disposed between the sliders, the output shaft of the torque generation device applying torque to the drive rollers to cause the drive rollers to roll while engaging the track rail to move the sliders along the track; and
   at least one substantially spherical rolling element, disposed in the rolling element circulating path of each of the sliders, for contacting the track rail and moving along in the rolling element circulating path when the sliders move along the track.

* * * * *